No. 713,970. Patented Nov. 18, 1902.
L. M. G. DELAUNAY-BELLEVILLE.
MANHOLE COVER.
(Application filed May 16, 1902.)
(No Model.)
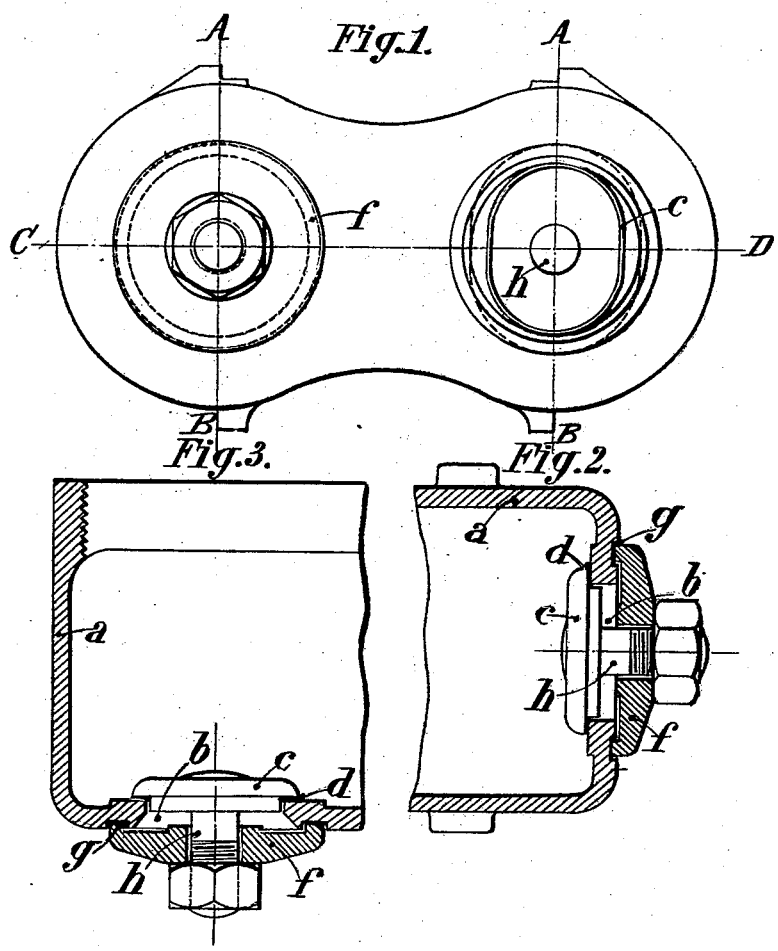

UNITED STATES PATENT OFFICE.

LOUIS MARIE GABRIEL DELAUNAY-BELLEVILLE, OF NEUILLY-SUR-SEINE, FRANCE.

MANHOLE-COVER.

SPECIFICATION forming part of Letters Patent No. 713,970, dated November 18, 1902.

Application filed May 16, 1902. Serial No. 107,681. (No model.)

*To all whom it may concern:*

Be it known that I, LOUIS MARIE GABRIEL DELAUNAY-BELLEVILLE, engineer, a citizen of the French Republic, residing at 17 Boulevard Richard-Wallace, Neuilly-sur-Seine, Seine, France, have invented certain new and useful Improvements in Manhole-Covers, of which the following is a specification.

This invention relates to manhole-covers; and the improved device consists of a header formed with an inner portion pressed onto a seating around the manhole or opening to be closed and an outer portion pressed against a corresponding seating around the outside of the said manhole or opening by a screw-bolt and nut, the screw-bolt projecting from the inner portion through a hole in the outer portion and the nut being screwed on the projecting end. The joints may be made by metal bearing on metal, or an elastic material may be interposed between the bearing-surfaces.

In order that my invention may be fully understood, I will describe the same with reference to the accompanying drawings, of which—

Figure 1 is an end view of a header having two doors made according to this invention, one of which being seen from outside, the other having its outer portion removed. Fig. 2 is a section through the line A B of Fig. 1. Fig. 3 is a section through the line C D of Fig. 1.

$a$ represents the water-tube header or the steam-reservoir, and $b$ the openings to which this invention is to be applied.

$c$ is the inner portion bearing on the seat $d$ inside the opening of the header, to which is secured a bolt $h$, extending outward and having a nut screwed on its end. The portion $c$, it will be seen upon reference to the right side of Fig. 1, is elliptical, so that the same can be passed through the circular manhole $b$ from the outside of the header by tipping the bolt $h$. The outer portion $f$ is preferably made of a dish form with its projecting edge seated in a groove $g$ around the outside of the manhole or other opening. The two portions are simultaneously tightened on their respective seats $d$ and $g$ by screwing the nut on the bolt $h$, the joints being made by the metal bearing directly on the metal or by an elastic material interposed between the bearing-surface.

Having now particularly described and ascertained the nature of my invention and in what manner it may be performed, I declare what I claim is—

The combination of a steam-boiler header having a circular opening or manhole, an inner elliptical portion the length of which is greater than the diameter of said opening or manhole and adapted to bear against the inside of the header, an outer portion bearing against the outside of the header, a bolt rigidly secured to the inner portion and extending through the said opening or manhole and also through said outer portion, and a nut on the outer end of the bolt for tightening said inner and outer portions against the corresponding face of the header.

In testimony whereof I have hereunto set my hand in presence of two subscribing witnesses.

LOUIS MARIE GABRIEL DELAUNAY-BELLEVILLE.

Witnesses:
EDWARD P. MACLEAN,
HIPPOLYTE JOSSE.